May 24, 1966        C. W. ALPEN        3,252,463
CUTTER FOR BRUSSELS SPROUTS
Filed Sept. 17, 1964
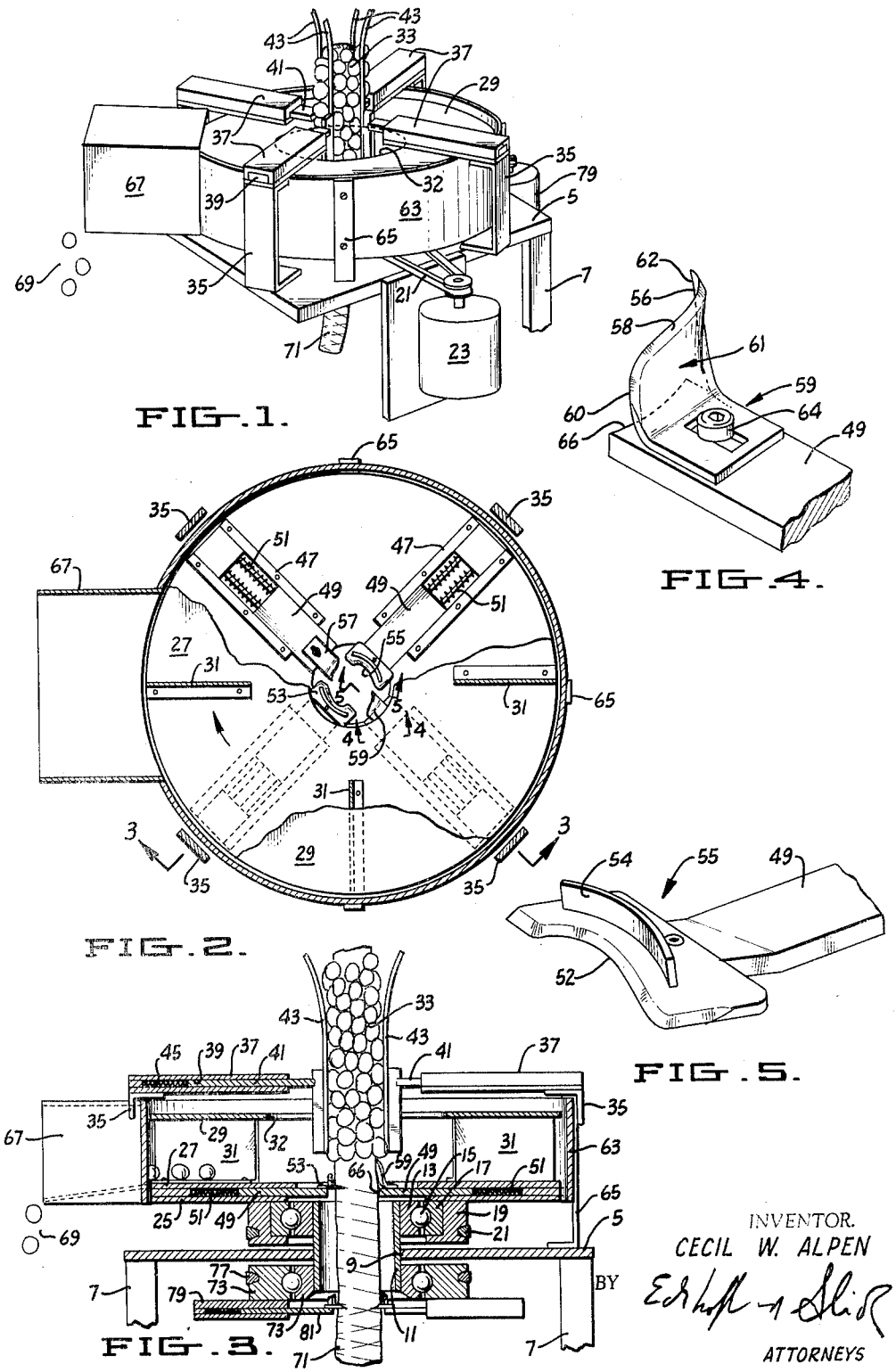
INVENTOR.
CECIL W. ALPEN
ATTORNEYS 3,252,463
CUTTER FOR BRUSSELS SPROUTS
Cecil W. Alpen, Aptos, Calif., assignor to Ralph Moceo and Louis Poletti, Santa Cruz, Calif.
Filed Sept. 17, 1964, Ser. No. 397,252
6 Claims. (Cl. 130—30)

This invention relates to a machine to cut or remove Brussels sprouts from the stalk on which the sprouts grow. The machine was expressly designed to harvest a new variety of Brussels sprouts known as the Jade variety, which is characterized by a great mass of closely spaced and closely held sprouts growing on a stalk, all of which ripen at the same time.

It is an object of the present invention to provide an improved cutter for cutting Brussels sprouts from the stalk on which the sprouts grow.

Another object of this invention is to provide a cutter which is peculiarly adapted for the cutting of Jade variety sprouts.

Still another object of this invention is to provide a continuously running, high production machine which completely removes the sprouts from the stalk on which they grow, yet which does not injure the sprouts in any manner.

Another object is to provide a cutter which removes the butt or stem of leaf from the sprout.

A further object of the invention is to provide a sprout cutter having a vertical feed so that gravity assists the feed.

Another object is to provide a sprout cutter which is adapted either for a processing plant use or for use in the field wherein a plurality of cutters can be mounted on a vehicle.

Still a further object of this invention is to provide a high speed cutter for Brussels sprouts which has relatively few moving parts and which is therefore simple to construct and maintain.

Further objects will become apparent from the specification which follows.

In the drawings forming a part of this application:

FIGURE 1 is a perspective view of a device embodying the present invention.

FIGURE 2 is a plan view of the machine of FIGURE 1, partly in section, showing the position of the various parts.

FIGURE 3 is a section on the line 3—3 of FIGURE 2.

FIGURE 4 is an enlarged perspective view, generally on the line 4—4 of FIGURE 2, showing one of the cutting knives.

FIGURE 5 is an enlarged perspective view, generally on the line 5—5 of FIGURE 2, of one of the knives which propel the Brussels sprout stalk through the machine.

Turning now to a description of the drawings by reference characters, the device of the present invention is mounted on a base 5 supported by legs 7. The base 5 has a central aperture 9 therein having a sleeve 11 mounted therein and which supports the inner race 13 of ball bearings 15. The outer race 17 of the bearings is attached to a pulley 19 around which a V-belt 21 is trained and which is driven by motor 23. Attached to pulley 19 is a bottom plate 25 which is spaced a short distance from an intermediate plate 27, leaving a space therebetween which holds the knife holders and spring mechanism, hereinafter described. A top plate 29 is provided which is supported by a plurality of baffles 31 from the plate 27. The top plate 29 has a large central aperture 32 therein to which Brussels sprouts 33 can be fed.

A plurality of side members 35, suitably four, are attached to the base 5, each of which has an inwardly extending top member 37 having a slot 39 therein through which a guide holder 41 supporting curved guide 43 passes. Each guide holder 41 is pressed inwardly by a spring mechanism 45.

Mounted between the plates 25 and 27 and retained by guides as at 47 are two series of knives. Each of the knives is retained on a knife holder as at 49, urging the holder inwardly by the springs 51. In the embodiment illustrated, there are four such knife holders and spring sets. The knives supported by the knife holders are of two varieties. The cutting knives perform the actual cutting operation and these two knives are designated 57 and 59. These knives have an upstanding curved blade as at 61 which has a concave inner surface 56, generally corresponding to the curvature of a sprout stalk and which is sharpened on its outside surface as at 58. Further, the leading edge 60 is lower than the trailing edge 62 so that the action of the knife is to draw it in close to the stalk insuring a clean cut. The knife is adjustably mounted as by a bolt 64 on the knife holder 49, and the forward surface 66 of the latter extends beyond the knife serving as a guard or gauge, to insure the exact desired position of the blade 61 relative to the stalk to cut only the sprouts therefrom. Thus as the stalk is pulled down through the machine these knives 61 lie along the stalk and cut the sprouts off of the stalk. The knives 53 and 55 have a spiral blade 52, as is shown in FIGURE 5, and are curved in such a manner that as the knives turn against the stationary stalk the spiral knives cut into the stalk and pull the stalk downwardly in the machine.

Guard 54 prevents the blade from entering too deep. As is shown in FIGURE 3, the spiral knives are located below the plane of the cutting knives, so that the spiral knives act on the denuded stalk. The stalks are prevented from turning by pressure on the vertical guides 43, heretofore described.

As the sprouts are cut off of the stalk, they are discharged into the space between the plates 27 and 29, whereupon they are picked up by the baffles 31 and propelled outwardly by centrifugal force. Preferably an outer casing 63, held by supports 65 on the base 5 is provided which serves to retain the sprouts on the intermediate plate 27 until they come to the chute 67, whereupon the sprouts are discharged as at 69. The stalks, denuded of the sprouts, pass downwardly through the base as at 71.

In a preferred embodiment of the invention a second set of counter-rotating spiral knives is employed to propel the stalks through the machine. Thus an inner bearing race 73 is mounted on base 5 with the outer race 75 forming a pulley driven by V-belt 77 and motor (not shown). Pulley 75 supports the spring mounted knife holders 79 and knives 81. These knives are of the same type as knife 55, but since these knives are driven in the opposite direction, the spiral configuration is of the opposite hand. The second set of knives gives a more positive feed and prevents any tendency of the stalk to turn.

It will be noted that the knives are preferably spring-mounted and installed very close to each other, so that the device will handle sprout stalks of any size including those stalks which are curved.

Thus, the operation of the machine is that a stalk of sprouts 33 is fed downwardly into the opening 32 where it is prevented from turning by the vertical guides 43, is engaged by the spiral knives 53 and 55 and the knives 81, if used and pulled downwardly, while the knives 57 and 59 cut the sprouts from the stalk.

This machine is designed in such a manner that it can be used as a stationary piece of equipment, but more important is its adaptability to be used on a moving vehicle right in the field. Loading the removed sprouts directly into a truck and dropping the denuded stalks back on the ground has the advantage that the stalks can be easily disked back into the earth.

Many variations in the device of the present invention may be made without departing from the spirit of this invention. Although the knives are shown as spring-mounted, it is obvious that the machine could be built for handling sprouts of uniform size so that the various knives described might be rigidly fixed rather than mounted on springs. Further, pairs of spiral and cutting knives have been described, but it is obvious that more knives of either or both varieties might be provided, it only being important that the knives be located symmetrically around the periphery of the machine.

It is believed evident from the foregoing that I have provided a simple yet effective device for cutting Brussels sprouts off of the stalk.

I claim:

1. A sprout cutter or the like comprising in combination:
   (a) a rotating member having a central aperture therein;
   (b) a plurality of vertical guides extending into said central aperture;
   (c) a plurality of symmetrically arranged first knives mounted on said rotating member, each said first knives having an upstanding cutting edge and spring urged toward said aperture;
   (d) a plurality of symmetrically arranged second knives mounted in said rotating member, each of said second knives having a spiral configuration and spring urged toward said aperture;
   (e) a third set of knives having a spiral configuration and rotating in the opposite direction from the second knives and spring urged toward said aperture whereby
   (f) a sprout stalk, prevented from turning by said vertical guides, is propelled through the machine by the second and third set of knives, and sprouts are cut off the stalk by the first knives.

2. A sprout cutter or the like comprising in combination:
   (a) a rotating member having a central aperture therein;
   (b) a plurality of symmetrically arranged spring urged first knives mounted on said rotating member, each said first knives having a cutting edge extending up through said aperture adjacent a stalk for cutting sprouts from such stalk as it passes through said aperture;
   (c) a plurality of symmetrically arranged second knives mounted on said rotating member, each of said second knives having a spiral configuration and spring means for urging the same into engagement with a stalk disposed in said aperture for propelling the stalk therethrough; and
   (d) a third set of knives each having a spirally configurated blade spring urged toward the stalk and rotating in a direction opposite to that of said second set of knives for counteracting turning of said stalk while aiding said second set of knives in propelling such stalk through the machine.

3. Apparatus for stripping Brussels sprouts from a stalk thereof comprising;
   (a) a vertically disposed stationary cylindrical casing having a discharge opening and chute at one side thereof;
   (b) a plurality of spring urged vertical guides mounted on the open upper end of said casing and extending downwardly into the center thereof for guiding a stalk of Brussels sprouts in non-turning fashion concentric to said casing;
   (c) a rotating member arranged in the open bottom end of said casing to provide a bottom therefor, said rotating member having a central aperture therein;
   (d) a set of radially arranged spring loaded cutting knives mounted on the lower surface of said rotating member, each of said cutting knives having a curved cutting edge extending upwardly through said aperture and a guard extending radially inward of the cutting knife associated therewith for engaging a Brussels sprout stalk and for positioning said curved cutting edge adjacent the stalk for cutting sprouts therefrom within said casing;
   (e) a radially arranged spring loaded spirally configurated blade mounted between and co-planar of each of said cutting knives on the lower surface of said rotating member, each of said spirally configurated blades having a guard thereon for engaging the denuded stalk for limiting entry of said spirally configurated blades thereinto whereby the latter turn screw-fashion about the stalk as it is guided in non-turning fashion by said vertical guides to thereby propel the stalk through the apparatus, the sprouts cut from such stalk falling onto said rotating member for discharge from said casing by centrifugal force via said discharge opening and chute.

4. Apparatus for stripping Brussels sprouts from a stalk thereof comprising:
   (a) a vertically disposed stationary cylindrical casing having a discharge opening and chute at one side thereof;
   (b) a plurality of spring urged vertical guides mounted on the open upper end of said casing and extending downwardly into the center thereof for guiding a stalk of Brussels sprouts in non-turning fashion concentric to said casing;
   (c) a rotating member arranged in the open bottom end of said casing to provide a bottom therefor, said rotating member having a central aperture therein;
   (d) a plurality of radially arranged spring loaded cutting knives mounted on the lower surface of said rotating member, each of said cutting knives having an inwardly extending guard for engaging a stalk and an upstanding cutting edge disposed adjacent the stalk and extending upwardly through said aperture for cutting sprouts from such stalk within said casing;
   (e) a radially arranged spring loaded spirally configurated stalk advancing blade mounted between and co-planar of each of said cutting knives on the lower surface of said rotating member, each of said stalk advancing blades having a guard thereon for engaging the denuded stalk for limiting entry of said spirally configurated blades thereinto whereby the latter turn screw-fashion about the stalk as it is guided in non-turning fashion by said vertical guides to thereby propel the stalk through the apparatus; and
   (f) a pluraliy of baffles on the upper surface of said rotating member for engaging sprouts cut from such stalk falling onto said rotating member and for discharging such sprouts from said casing by centrifugal force via said discharge opening and chute.

5. Apparatus for stripping Brussels sprouts from a stalk thereof comprising in combination:
   (a) a vertically disposed cylindrical stationary casing having a discharge opening in its side wall communicating with an outwardly extending discharge chute;
   (b) a plurality of spring urged vertical guides mounted on the open upper end of said casing and extending downwardly into the center thereof for guiding a stalk of Brussels sprouts in non-turning fashion concentric thereto;
   (c) a rotating member arranged in the open bottom of said casing and having a central aperture for receiving a denuded stalk for passage therethrough;

(d) a plurality of radially arranged knife holders mounted on the underside of said rotating member and means for urging said knife holders inwardly toward the central axis of said rotating member for engaging a denuded stalk passing through the aperture thereof;

(e) a cutting knife mounted on alternate ones of said knife holders and each having an upstanding curved cutting edge disposed on said holders in close proximity to a stalk engaged thereby for cutting sprouts from such stalk within said casing; and (f) a stalk advancing blade on each of the balance of said knife holders between said alternate ones thereof, each of said stalk advancing blades having a spirally configured inwardly facing edge for engaging the denuded stalk for turning screw-fashion about said stalk as it is guided in non-turning fashion by said vertical guides for propelling such stalk through the apparatus; whereby sprouts cut from such stalk fall upon said rotating member within said casing for discharge therefrom by centrifugal force via said discharge opening and chute.

6. Apparatus for stripping Brussels sprouts from a stalk thereof comprising in combination:

(a) a vertically disposed cylindrical stationary casing having a discharge opening in its side wall communicating with an outwardly extending discharge chute;

(b) a plurality of spring urged vertical guides mounted on the open upper end of said casing and extending downwardly into the center thereof for guiding a stalk of Brussels sprouts in non-turning fashion concentric thereto;

(c) a rotating member arranged in the open bottom of said casing and having a central aperture for receiving a denuded stalk for passage therethrough;

(d) a plurality of radially arranged knife holders mounted on the underside of said rotating member and means for urging said knife holders inwardly toward the central axis of said rotating member for engaging a denuded stalk passing through the aperture thereof;

(e) a cutting knife mounted on alternate ones of said knife holders and each having an upstanding cutting edge disposed on said holders adjacent a stalk engaged thereby for cutting sprouts from such stalk within said casing;

(f) a stalk advancing blade on each of the balance of said knife holders, each of said stalk advancing blades having a spirally configured inwardly facing edge for engaging a denuded stalk for turning screw-fashion about the same as it is guided in non-turning fashion by said vertical guides for propelling such stalk downwardly through the apparatus; and (g) a plurality of battles arranged in radial array on the upper side of said rotating member for propelling cut sprouts within said casing outwardly by centrifugal force for discharge from said casing via said discharge opening and chute in the side wall thereof.

References Cited by the Examiner

UNITED STATES PATENTS

| | | | |
|---|---|---|---|
| 96,658 | 11/1869 | Barker | 130—9.2 |
| 103,543 | 5/1870 | Barker | 130—9.2 |
| 178,536 | 6/1876 | Lewis | 130—9.2 |
| 247,511 | 9/1881 | Nisbitt | 130—9.3 |
| 327,864 | 10/1885 | Collins | 130—9.3 |
| 3,175,561 | 3/1965 | Oldershaw | 130—30 |

ABRAHAM G. STONE, *Primary Examiner.*

JOE O. BOLT, *Assistant Examiner.*